E. G. MATTHEWS.
HAND CULTIVATOR.
No. 91,144.            Patented June 8, 1869.
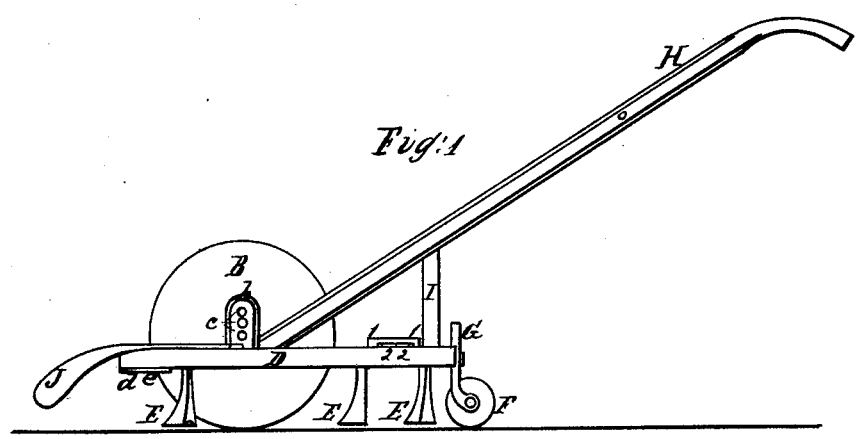
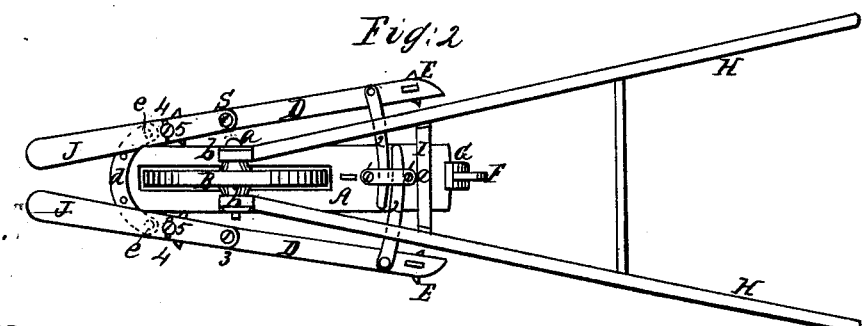
Witnesses
Thos. H. Dodge
Albert E. Peirce
Inventor
E G Matthews

United States Patent Office.

E. G. MATTHEWS, OF NEWTON, MASSACHUSETTS.

*Letters Patent No. 91,144, dated June 8, 1869.*

---

IMPROVEMENT IN HAND-CULTIVATOR.

---

The Schedule referred to in these Letters Patent and making part of the same.

---

*Know all men by these presents:*

That I, E. G. MATTHEWS, of Newton, in the county of Middlesex, and Commonwealth of Massachusetts, have invented certain new and useful Improvements in Hand-Cultivators and Weeders; and I do hereby declare that the following is a full, clear, and exact description of the same, reference being had to the accompanying drawings, forming a part of this specification, in which—

Figure 1 represents a side view of my improved cultivator and weeder, and

Figure 2 represents a top or plan view of the same.

To enable those skilled in the art to which my invention belongs, to make and use the same, I will describe my improvements more in detail.

In the drawings—

A is the central frame, provided with a slot in which the main wheel B is placed, the journal $a$ of the wheel being supported in standards $b$ $b$, provided with a series of holes, $c$, whereby the height of the frames can be adjusted to permit the teeth E to enter the rail to any desired depth.

The front of the frame A is provided with straps, $d$ $d$, between the ends of which the wings D D are hinged, at $e$ $e$.

To the wings D D are fastened the teeth E, two of the teeth being arranged forward of the centre of wheel B, one just in rear of the same, and one at the rear end of each wing D, as fully shown in the drawings.

The rear end of the frame A is provided with a small roll or wheel, F, journalled in the lower curved end of the stand G, which is fastened to the rear end of frame A in such a manner that it can be adjusted up or down to support the rear end of frame A, and the wings D, at any desired distance above the ground.

The wings D D can be opened and closed to cultivate rows of young and growing plants by loosening the screws, thereby allowing the plates 2 2 to slide in or out, as the case may be.

The handles H H are secured to the frame A, just in rear of the standards $b$ $b$, and are supported from frame A by the curved metal brace I, as indicated in the drawings.

In cultivating young and growing plants and crops, it is often the case that injury is done by the teeth catching the young stalks, which may happen to lean over between the rows, and to obviate the difficulty I provide the front ends of the wings D with stalk-lifting arms J J.

The front ends of the wings J extend down in curved form in front of the frame, so as to run under the young plants or stalks, whereby the latter are lifted and gradually turned back out of the reach of the teeth E as the machine is forced along.

The arms J are hinged, at 3, to the wings D.

They are also provided with slots 4, through which pass screws 5, whereby their front ends can be set nearer together or further apart, as may be desired.

By arranging the wheel B near the centre of frame A, in combination with the use of the rear supporting-wheel F, the cultivator can be run with greater ease, and at the same time cultivate and stir the earth with greater uniformity and evenness than can be done with machines in which the large wheel is arranged forward of the frame.

The bars 2 2 are arranged in the same horizontal plane, and not one over the other, and consequently the wings can be closed up close to frame A, which is not the case in those machines in which the plates or bar lap over each other.

Having described my improved hand-cultivator and weeder,

What I claim therein as new and of my invention, and desire to secure by Letters Patent, is—

1. The arrangement, with the slotted frame A and adjustable wing-frames D D, of the central wheel B, substantially as described.

2. The combination, with frames A and D, of the wheels B and F, substantially as and for the purposes set forth.

3. The arrangement of the teeth E, as respects the wheels B and F, and each other, as shown and described.

4. The plant-lifting arms J J, substantially as and for the purposes set forth.

E. G. MATTHEWS.

Witnesses:
THOS. H. DODGE,
ALBERT E. PEIRCE.

*Assignor to C. C. Holbrook of Dorchester, Massachusetts.*